United States Patent
Aoki et al.

(10) Patent No.: US 10,071,365 B2
(45) Date of Patent: *Sep. 11, 2018

(54) CATALYTIC CONVERTER

(71) Applicants: Yuki Aoki, Seto (JP); Hiromasa Suzuki, Toyota (JP); Hiroyuki Matsubara, Gifu (JP)

(72) Inventors: Yuki Aoki, Seto (JP); Hiromasa Suzuki, Toyota (JP); Hiroyuki Matsubara, Gifu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 130 days.

This patent is subject to a terminal disclaimer.

(21) Appl. No.: 14/761,847

(22) PCT Filed: Nov. 26, 2013

(86) PCT No.: PCT/JP2013/081727
§ 371 (c)(1),
(2) Date: Jul. 17, 2015

(87) PCT Pub. No.: WO2014/115419
PCT Pub. Date: Jul. 31, 2014

(65) Prior Publication Data
US 2015/0352524 A1    Dec. 10, 2015

(30) Foreign Application Priority Data

Jan. 23, 2013  (JP) ................................. 2013-010513

(51) Int. Cl.
*B01J 23/42*     (2006.01)
*B01D 53/94*    (2006.01)
(Continued)

(52) U.S. Cl.
CPC .............. *B01J 23/42* (2013.01); *B01D 53/94* (2013.01); *B01J 23/40* (2013.01); *B01J 23/464* (2013.01);
(Continued)

(58) Field of Classification Search
None
See application file for complete search history.

(56) References Cited

U.S. PATENT DOCUMENTS 5,538,697 A * 7/1996 Abe ..................... B01D 53/945
                                                             422/169
2002/0042344 A1   4/2002 Kondo et al.
(Continued)

FOREIGN PATENT DOCUMENTS

CA    2485893 A1    4/2005
CN    1623635 A     6/2005
(Continued)

OTHER PUBLICATIONS

An Office Action (Notice of Allowance) dated Jan. 11, 2017, which issued during the prosecution of U.S. Appl. No. 14/782,060.
(Continued)

*Primary Examiner* — Walter D. Griffin
*Assistant Examiner* — Jelitza M Perez
(74) *Attorney, Agent, or Firm* — Sughrue Mion, PLLC

(57) ABSTRACT

There is provided a catalytic converter that offers high exhaust gas cleaning performance by effectively utilizing a whole catalyst that constitutes the catalytic converter.
In a catalytic converter (10), catalytic layers (2A, 2B) made of a noble metal catalyst are formed on cell wall surfaces of a substrate (1) having a cell structure, and the catalytic layers (2A, 2B) extend in a longitudinal direction of the substrate (1) along which gas flows. The substrate (1) has a central region (1A) having a relatively high cell density and a
(Continued)

peripheral region (1B) having a relatively low cell density. The length of each of the catalytic layers (2B) in the longitudinal direction in the peripheral region (1B) is longer than the length of each of the catalytic layers (2A) in the longitudinal direction in the central region (1A).

5 Claims, 3 Drawing Sheets

(51) Int. Cl.
  *F01N 3/24*    (2006.01)
  *B01J 23/46*    (2006.01)
  *B01J 35/04*    (2006.01)
  *F01N 3/28*    (2006.01)
  *B01J 37/02*    (2006.01)
  *B01J 23/40*    (2006.01)
  *B01J 35/00*    (2006.01)
  *B01J 23/63*    (2006.01)

(52) U.S. Cl.
  CPC ........... *B01J 23/63* (2013.01); *B01J 35/0006* (2013.01); *B01J 35/04* (2013.01); *B01J 37/0244* (2013.01); *F01N 3/2803* (2013.01); *B01D 2255/10* (2013.01); *B01D 2255/1021* (2013.01); *B01D 2255/1025* (2013.01); *B01D 2255/902* (2013.01); *F01N 2330/48* (2013.01); *F01N 2510/0682* (2013.01); *F01N 2510/0684* (2013.01)

(56) References Cited

U.S. PATENT DOCUMENTS

| | | | |
|---|---|---|---|
| 2007/0196248 A1* | 8/2007 | Mizutani | B01D 46/0063 422/180 |
| 2008/0004174 A1 | 1/2008 | Itoh et al. | |
| 2013/0045148 A1* | 2/2013 | Chivilikhin | B01D 53/9454 423/212 |
| 2013/0213000 A1 | 8/2013 | Segawa | |
| 2016/0038877 A1 | 2/2016 | Aoki et al. | |

FOREIGN PATENT DOCUMENTS

| | | | |
|---|---|---|---|
| DE | 19938038 A1 | 5/2000 | |
| EP | 1342889 A1 | 9/2003 | |
| GB | 2342055 A * | 4/2000 | ......... B01D 53/885 |
| JP | 54-99090 A | 8/1979 | |
| JP | 60-125252 A | 7/1985 | |
| JP | 10174866 A | 6/1998 | |
| JP | 10244167 A | 9/1998 | |
| JP | 2002-177794 A | 6/2002 | |
| JP | 2006281134 A | 10/2006 | |
| JP | 2007330860 A | 12/2007 | |
| JP | 2010-005590 A | 1/2010 | |
| JP | 2012096201 A | 5/2012 | |
| WO | 2010/001226 A1 | 1/2010 | |

OTHER PUBLICATIONS

Ryu Sen Shun "Emission and Control of Internal Combustion Engine" 6.12 Catalyst Composition (pp. 162-163).

Communication dated Apr. 26, 2017, from the State Intellectual Property Office of People's Republic of China in counterpart Application No. 201380071118.7.

An Office Action dated Jun. 9, 2017, which issued during the prosecution of U.S. Appl. No. 14/782,060.

* cited by examiner

CATALYTIC CONVERTER

TECHNICAL FIELD

The present invention relates to a catalytic converter fixedly accommodated in a pipe that constitutes an exhaust system for exhaust gas.

BACKGROUND ART

In various industrial fields, various efforts are underway on a worldwide scale to reduce environmental impacts and environmental loads. Especially in the field of automobile industry, the widespread use of not only gasoline engine vehicles with high fuel efficiency performance but also so-called eco-friendly vehicles such as hybrid vehicles and electric automobiles is promoted, and the development focused on further enhancement of the performance of such vehicles is advanced day by day.

An exhaust system for exhaust gas, which connects a vehicle engine to a muffler, is usually provided with a catalytic converter for cleaning exhaust gas.

An engine may emit substances harmful to the environment, such as CO, NOx, and unburned HC and VOC. In order to convert such toxic substances into acceptable substances, a catalytic layer made of a noble metal catalyst such as palladium or platinum is formed on each of cell wall surfaces of a large number of cells included in a substrate. More specifically, on each of the cell wall surfaces of a large number of the cells, the catalytic layer is formed to extend along a longitudinal direction of the substrate, which is a direction along which exhaust gas flows. As the exhaust gas passes through a catalytic converter including such a substrate configured as described above, CO is converted into $CO_2$, NOx is converted into $N_2$ and $O_2$, and VOC is burned to produce $CO_2$ and $H_2O$.

In commonly-used catalytic converters, the cell density in a substrate having, for example, a honeycomb structure is uniform. Such catalytic converters have a problem that it is difficult to make full use of catalytic layers of the whole substrate because the exhaust gas flow velocity is higher in a central region in a cross-section of the substrate than in a peripheral region in the cross-section of the substrate. If a catalytic converter in which the cell density is higher in a central region of a substrate than in a peripheral region of the substrate is provided in consideration of the exhaust gas flow velocity distribution described above, it is possible to minimize a variation of the flow velocity distribution within a cross-section of the substrate. This makes it possible to effectively utilize catalytic layers of the whole catalytic converter to clean exhaust gas.

Patent Literature 1 discloses a technique for improving the exhaust gas cleaning performance. According to this technique, in a substrate of a catalytic converter (a catalyst body, in this case) having, for example, a honeycomb structure in which the cell density is uniform as a whole, the amount of noble metal catalysts supported on a central region (a central portion, in this case) of the substrate is made different from the amount of noble metal catalysts supported on a peripheral region (an outer peripheral portion, in this case) thereof. More specifically, in the catalyst body, the amount of catalysts per unit volume, supported on the central portion where a large amount of gas flows, is at least 1.1 times as large as the amount of catalysts per unit volume, supported on the outer peripheral portion. However, in this technique, the cell density is uniform in the whole catalyst, and thus high exhaust gas cleaning performance cannot be expected.

CITATION LIST

Patent Literature

Patent Literature 1: Japanese Patent Application Publication No. 2002-177794

SUMMARY OF THE INVENTION

Technical Problem

The present invention is made in view of the above-described problem, and an object of the present invention is to provide a catalytic converter that offers high exhaust gas cleaning performance by effectively utilizing a whole catalyst that constitutes the catalytic converter.

Solution to Problem

In order to achieve the above-described object, a catalytic converter according to the present invention is a catalytic converter in which catalytic layers made of a noble metal catalyst are formed on cell wall surfaces of a substrate having a cell structure, the catalytic layers extending in a longitudinal direction of the substrate along which gas flows, wherein the substrate has a central region having a relatively high cell density and a peripheral region having a relatively low cell density, and the length of each of the catalytic layers in the longitudinal direction in the peripheral region is longer than the length of each of the catalytic layers in the longitudinal direction in the central region.

In the catalytic converter according to the present invention, the substrate having a large number of cells has the central region and the peripheral region that are different in cell density from each other, and the cell density in the central region is set relatively high. Thus, the difference in exhaust gas flow velocity between the central region and the peripheral region is smaller than that in a substrate having a uniform cell density. This makes it possible to effectively utilize the whole catalyst that constitutes the catalytic converter to clean exhaust gas. Furthermore, the length (length in a direction along which exhaust gas flows within the substrate) of each catalytic layer in the longitudinal direction in the peripheral region is set longer than the length of each catalytic layer in the longitudinal direction in the central region. Thus, the catalytic converter is expected to offer favorable exhaust gas cleaning performance.

The reason for this will be described below. That is, in the substrate in which the cell density in the central region is relatively high in a vertical sectional view obtained by cutting the substrate with a section along the longitudinal direction of the substrate, the amount of exhaust gas flowing into the peripheral region having a relatively low cell density is larger than that in the substrate having a uniform cell density per unit volume. Regarding the length of the catalytic layers formed on the cell wall surfaces in the longitudinal direction of the substrate (the ratio of the length of the catalytic layer in the longitudinal direction to the length of the catalytic layer in the longitudinal direction is set to various ratios), if the catalytic layers of the conventional substrate having a uniform cell density in the whole substrate are used as the catalytic layers of the substrate in which the cell density is varied, sufficient cleaning performance cannot be obtained because the amount of exhaust gas (exhaust gas that should be cleaned) flowing into the peripheral region having a low cell density is larger than that in the substrate having a uniform cell density. In view of this, the cell density in the central region and the cell density in the peripheral region are set different from each other, and, furthermore, the length of each catalytic layer in the longitudinal direction in the peripheral region is set longer than the length of each catalytic layer in the longitudinal direction in the central region. Thus, the area of contact between the catalytic layers and the exhaust gas in the peripheral region is increased. As a result, the exhaust gas cleaning performance is enhanced.

As an embodiment of the catalytic layer formed on the cell wall surface, there may be employed an embodiment in which the catalytic layer has a double layer structure formed of a lower layer disposed on the cell wall surface and an upper layer disposed on the lower layer, and each of the layers is made of one of, or two or more of Pd, Pt, and Rh which are noble metal catalysts.

As the substrate having a cell structure used in this case, substrates made of ceramic materials such as cordierite, which is made of a composite oxide formed of magnesium oxide, aluminum oxide and silicon dioxide, and silicon carbide, and substrates made of materials other than ceramic materials, such as metallic materials may be used. The substrate may be formed of a honeycomb structural body having a large number of cells with a contour of a quadrangular lattice, a hexagonal lattice, an octagonal lattice, or the like.

In the catalytic converter, regarding a ratio of each catalytic layer, a ratio of the length of each of the catalytic layers in the longitudinal direction in the central region to the length of the substrate in the longitudinal direction is preferably equal to or higher than 65%.

The present inventors have confirmed that, when the ratio of the length of each catalytic layer in the longitudinal direction in the central region to the length of the substrate in the longitudinal direction is equal to or higher than 65%, high performance is offered.

In the catalytic converter, a ratio of the length of each of the catalytic layers in the longitudinal direction in the central region to the length of the substrate in the longitudinal direction is preferably 80%, and a ratio of the length of each of the catalytic layers in the longitudinal direction in the peripheral region to the length of the substrate in the longitudinal direction is preferably 85% to 100%.

The present inventors have confirmed that, when the above-described ratio of the length of each catalytic layer in the longitudinal direction in the central region and the ratio of the length of each catalytic layer in the longitudinal direction in the peripheral region are employed, high performance is offered.

In addition, a ratio of the cell density in the central region to the cell density in the peripheral region is preferably within a range of 1:1 to 2:1, 1:1 being excluded from the range and 2:1 being included in the range.

The present inventors have confirmed that, when the ratio of the cell density is within the range of 1:1 to 2:1, 1:1 being excluded from the range and 2:1 being included in the range, the performance is higher than that in an example in which the length of each catalytic layer is fixed to 80% in both the central region and the peripheral region and the cell density is not varied. Thus, in the catalytic converter in the preferable embodiment, the ratio of the cell density in the central region to the cell density in the peripheral region is set to be within the range of 1:1 to 2:1, 1:1 being excluded from the range and 2:1 being included in the range.

If the ratio of the cell density is equal or lower than 1:1, control of the amount of exhaust gas flowing into each region, which is executed based on the difference in cell density between the central region and the peripheral region, may not be sufficiently effective. On the other hand, if the ratio of the cell density exceeds 2:1, the amount of exhaust gas flowing into the peripheral region may be excessively large, and thus the cleaning performance may be lowered. These are the grounds for setting the upper and lower limits of the aforementioned numerical range.

The catalytic converter according to the present invention preferably includes a cordierite honeycomb support having high resistant to heat and impact. Alternatively, the catalytic converter may be an electrically heated catalytic converter (EHC). The electrically heated catalytic converter is obtained, for example, by mounting a pair of electrodes on a honeycomb catalyst. When the electrodes are energized, the honeycomb catalyst is heated, the activity of the honeycomb catalyst is increased, and in this way, the exhaust gas passing through the catalytic converter turns into harmless gas. When such a catalytic converter is applied to an exhaust system for exhaust gas, which connects a vehicle engine to a muffler, the exhaust gas is cleaned at room temperature and is cleaned by activating the catalyst through electrical heating when the exhaust gas is cold.

Advantageous Effects of Invention

As can be understood from the foregoing description, in the catalytic converter according to the present invention, the substrate, which is a component of the catalytic converter, has the central region having a relatively high cell density and the peripheral region having a relatively low cell density, and the length of each of the catalytic layers in the longitudinal direction in the peripheral region is longer than the length of each of the catalytic layers in the longitudinal direction in the central region. Thus, the catalytic converter having high exhaust gas cleaning performance is provided.

DESCRIPTION OF EMBODIMENTS

Hereinafter, a catalytic converter according to an embodiment of the present invention will be described with reference to the drawings.

Exhaust System for Exhaust Gas

First, an exhaust system for exhaust gas, which includes the catalytic converter according to the present invention, will be outlined. In the exhaust system for exhaust gas, to which the catalytic converter according to the present invention is applied, an engine, the catalytic converter, a three-way catalytic converter, a sub-muffler, and a main muffler are disposed and connected to each other via a system pipe. The exhaust gas generated by the engine flows through these components via the system pipe and is then discharged. Next, the catalytic converter according to the embodiment will be described below.

Catalytic Converter According to the Embodiment

Figure 1:
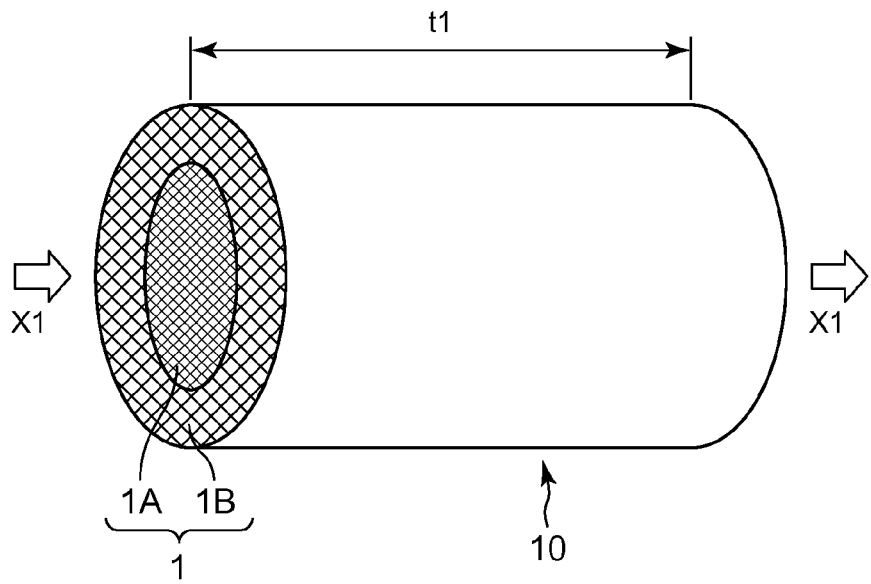
FIG. 1 is a schematic view illustrating a catalytic converter according to an embodiment of the present invention.
Figure 2A:
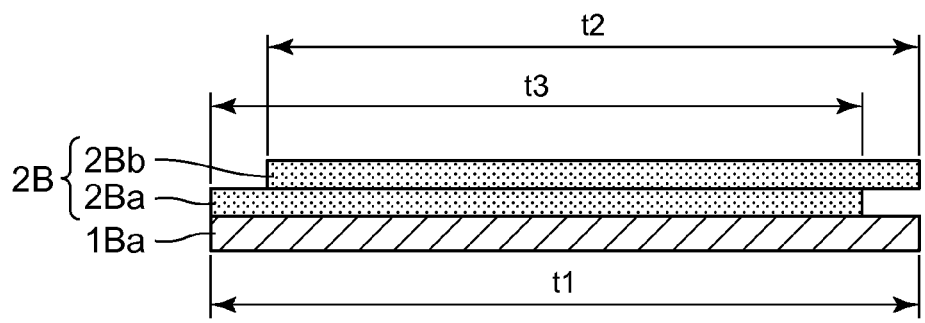
FIG. 2A is a schematic view illustrating the length of a cell wall surface in the longitudinal direction and the lengths of an upper layer and a lower layer of a catalytic layer having a double layer structure in the longitudinal direction in a peripheral region of a substrate.
Figure 2B:
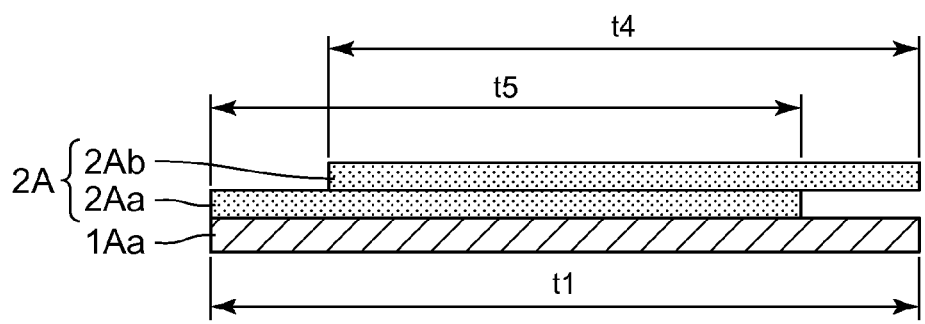
FIG. 2B is a schematic view illustrating the length of a cell wall surface in the longitudinal direction and the lengths of an upper layer and a lower layer of a catalytic layer having a double layer structure in the longitudinal direction in a central region of the substrate.
Figure 3:
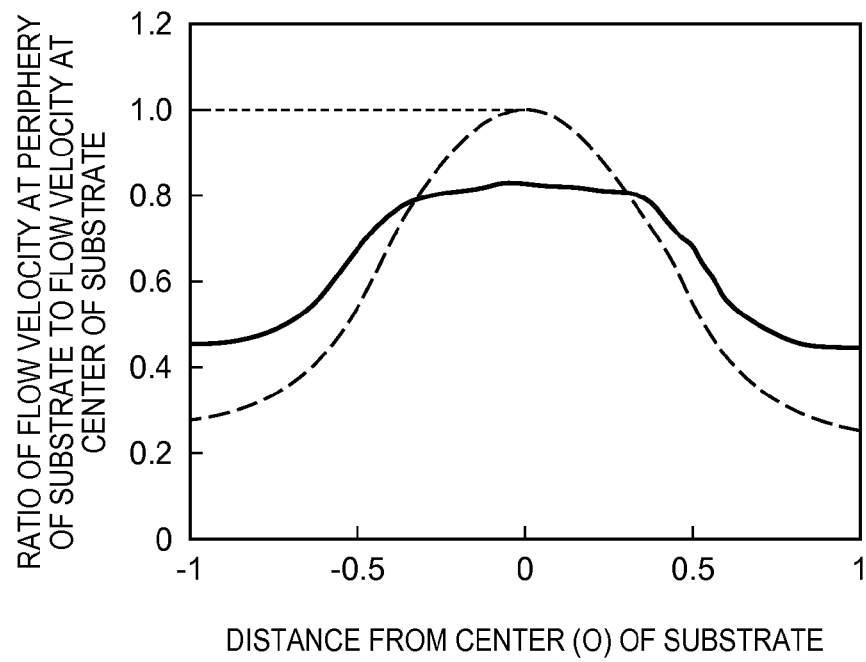
FIG. 3 is a graph illustrating an exhaust gas flow velocity distribution in a substrate having a uniform cell density, and an exhaust gas flow velocity distribution in a substrate in which a central region and a peripheral region are different in cell density from each other.

FIG. 1 is a schematic view illustrating the catalytic converter according to the embodiment of the present invention. FIG. 2A is a schematic view illustrating the length of a cell wall surface in the longitudinal direction and the lengths of an upper layer and a lower layer of a catalytic layer having a double layer structure in the longitudinal direction in a peripheral region of a substrate, and FIG. 2B is a schematic view illustrating the length of a cell wall surface in the longitudinal direction and the lengths of an upper layer and a lower layer of a catalytic layer having a double layer structure in the longitudinal direction in a central region of the substrate. FIG. 3 is a graph illustrating an exhaust gas flow velocity distribution in a substrate having a uniform cell density, and an exhaust gas flow velocity distribution in a substrate in which a central region and a peripheral region are different in cell density from each other.

A catalytic converter 10 illustrated in FIG. 1 mainly includes a tubular substrate 1 having a large number of cells, and catalytic layers formed on cell wall surfaces that define the cells, the catalytic layers having a double layer structure.

Examples of material of the substrate 1 include ceramic materials such as cordierite, which is made of a composite oxide formed of magnesium oxide, aluminum oxide and silicon dioxide, and silicon carbide, and materials other than ceramic materials, such as metallic materials. Examples of a support constituting the catalytic layer formed on each cell wall surface of the substrate include an oxide that contains, as a main component, at least one of $CeO_2$, $ZrO_2$m, and $Al_2O_3$, which are porous oxides. Examples of the support include an oxide made of any one of ceria ($CeO_2$), zirconia ($ZrO_2$) and alumina ($Al_2O_3$), and a composite oxide made of two or more of the aforementioned oxides (a $CeO_2$—$ZrO_2$ compound which is a so-called CZ material, a three-way composite oxide such as $Al_2O_3$—$CeO_2$—$ZrO_2$ (an ACZ material) into which $Al_2O_3$ has been introduced as a diffusion barrier, and the like).

The substrate 1 is formed of a honeycomb structural body having a large number of cells with a contour of a quadrangular lattice, a hexagonal lattice, an octagonal lattice, or the like, and exhaust gas flows in each of the cells (in a direction X1).

The substrate 1 has two regions, that is, a central region 1A having a relatively high cell density and a peripheral region 1B having a relatively low cell density.

The exhaust gas flow velocity distribution will be described with reference to FIG. 3. The flow velocity distribution illustrated in FIG. 3 is obtained in the following manner. In each substrate having a circular cross section, the center is expressed by 0, the two end points of a diameter passing through the center are expressed by 1 and −1, and a position between the two end points is expressed by a ratio of the distance between the position and the center of the substrate, to the radius of the substrate. Then, in order to obtain the exhaust gas flow velocity distribution, the flow velocity of the exhaust gas at each position described above is expressed by a ratio of the flow velocity at the position to the flow velocity at the center of a substrate of a catalytic converter in which the substrate has a uniform cell density.

In the catalytic converter in which the substrate has a uniform cell density, as indicated by a dashed line in FIG. 3, the exhaust gas flow velocity is considerably higher in the central region in a cross-section of the substrate than in the peripheral region in the cross-section of the substrate. This makes it difficult to make full use of catalytic layers of the whole substrate. In contrast to this, in the catalytic converter 10 according to the present invention, the substrate 1 has two regions that are different in cell density from each other, and the cell density in the peripheral region 1B is set relatively low. Thus, as indicated by a solid line in FIG. 3, the difference in flow velocity between the central region 1A and the peripheral region 1B of the substrate 1 is considerably small. This makes it possible to effectively utilize all the catalytic layers of the catalytic converter 10 to clean the exhaust gas.

In addition, in the catalytic converter 10 illustrated in the drawing, the length of the catalytic layer formed on each cell wall surface in the peripheral region 1B of the substrate 1 is different from that in the central region 1A of the substrate 1.

A catalytic layer 2B, which is formed on a cell wall surface 1Ba in the peripheral region 1B illustrated in FIG. 2A, has a double layer structure composed of a lower layer 2Ba disposed on the cell wall surface 1Ba and an upper layer 2Bb that is disposed on the lower layer 2Ba and thus comes into direct contact with the exhaust gas. Each of the layers is formed of one of, or two or more of Pd, Pt, and Rh which are noble metal catalysts. Likewise, a catalytic layer 2A, which is formed on a cell wall surface 1Aa in the central region 1A illustrated in FIG. 2B, has a double layer structure formed of a lower layer 2Aa disposed on the cell wall surface 1Aa and an upper layer 2Ab disposed on the lower layer 2Aa. Each of the layers is formed of one of, or two or more of Pd, Pt, and Rh which are noble metal catalysts.

If the length of the substrate 1 in the longitudinal direction (the length in a direction along which the exhaust gas flows) is expressed by t1, the length of each of the cell wall surfaces 1Aa, 1Ba is also expressed by t1. In contrast to this, a length t4 of the upper layer 2Ab of the catalytic layer 2A and a length t2 of the upper layer 2Bb of the catalytic layer 2B satisfy a relationship of t1>t2>t4, and a length t5 of the lower layer 2Aa of the catalytic layer 2A and a length t3 of the lower layer 2Ba of the catalytic layer 2B satisfy a relationship of t1>t3>t5.

As described above, the cell density in the central region 1A and the cell density in the peripheral region 1B are made different from each other, and, further, the length of (each of the upper layer 2Bb and the lower layer 2Ba of) the catalytic layer 2B in the longitudinal direction in the peripheral region 1B is set longer than the length of (each of the upper layer 2Ab and the lower layer 2Aa of) the catalytic layer 2A in the longitudinal direction in the central region 1A. Thus, the catalytic converter 10 is expected to offer favorable exhaust gas cleaning performance.

Regarding the cell density, preferably, the ratio of the cell density in the central region 1A to the cell density in the peripheral region 1B is set to be within a range of 1:1 to 2:1, 1:1 being excluded from the range and 2:1 being included in the range. If the ratio of the cell density is equal or lower than 1:1, control of the amount of exhaust gas flowing into each region, which is executed based on the difference in cell density between the central region 1A and the peripheral region 1B, may not be sufficiently effective. On the other hand, if the ratio of the cell density exceeds 2:1, the amount of exhaust gas flowing into the peripheral region 1B may be excessively large, and thus the cleaning performance may be lowered. These are the grounds for setting the upper and lower limits of the aforementioned numerical range.

Note that, the catalytic layer may be in the form of a single layer structure or in the form of a triple or more layer structure, instead of being in the form of a double layer structure as in the example illustrated in the drawing.

Experiments on the Length of a Catalytic Layer in a Peripheral Region (a Ratio With Respect to the Length of a Substrate) and the Temperature at Which the NOx Removal Rate Reaches 50%, and Results of the Experiments The present inventors prepared substrates having a honeycomb structure used in Examples 1 to 3 and Comparative examples 1 and 2 described below. These substrates are different from each other in length of a catalytic layer in a peripheral region (in ratio of the length of the catalytic layer in the peripheral region to the length of the substrate). Then, the present inventors carried out experiments of measuring temperatures at which the NOx removal rate reached 50%, on the substrates of Examples 1 to 3 and Comparative examples 1 and 2.

Example 1

A substrate having a honeycomb structure made of cordierite was prepared by extrusion molding, and the cell density in a central region and the cell density in a peripheral region were made different from each other. Regarding the size of the honeycomb structural body, the diameter of a circular cross-section orthogonal to a direction along which the exhaust gas flows is φ103 mm; the length t1 in the longitudinal direction is 105 mm; the cell density in the peripheral region having a relatively low cell density is 400 cpsi (62 cells/cm$^2$); the cell density in the central region having a relatively high cell density is 600 cpsi (93 cells/cm$^2$); a boundary line between the central region and the peripheral region is at a position of φ70 mm; and the cells have a quadrangular lattice shape. Furthermore, each catalytic layer has a double layer structure composed of a lower layer as a Pt supporting layer that supports Pt in an amount of 0.3 g/L, and an upper layer as a Rh supporting layer that supports Rh in an amount of 0.1 g/L. The length of each of the upper and lower layers in the central region is 80% of the length t1 of the substrate, and the length of each of the upper and lower layers in the peripheral region is 90% of the length t1 of the substrate.

Example 2

The configurations are the same as those in Example 1, except that, regarding the length of a catalytic layer, the length of each of upper and lower layers in a peripheral region is 85% of the length of the substrate.

Example 3

The configurations are the same as those in Example 1, except that, regarding the length of a catalytic layer, the length of each of upper and lower layers in a peripheral region is 100% of the length of the substrate.

Comparative Example 1

The configurations are the same as those in Example 1, except that, regarding the length of a catalytic layer, the length of each of upper and lower layers in a peripheral region is 80% of the length of the substrate (thus, the length of (each of upper and lower layers of) a catalytic layer in a central region is the same as the length of (each of the upper and lower layers of) the catalytic layer in the peripheral region.

Comparative Example 2

The configurations are the same as those in Example 1, except that, regarding the length of a catalytic layer, the length of a lower layer in a peripheral region is 70% of the length of the substrate.

Experimental Method

In each test for evaluating the cleaning performance, a real engine was used, and a temperature at which NOx was removed by 50% at a stoichiometric air-fuel ratio was measured.

Figure 4:
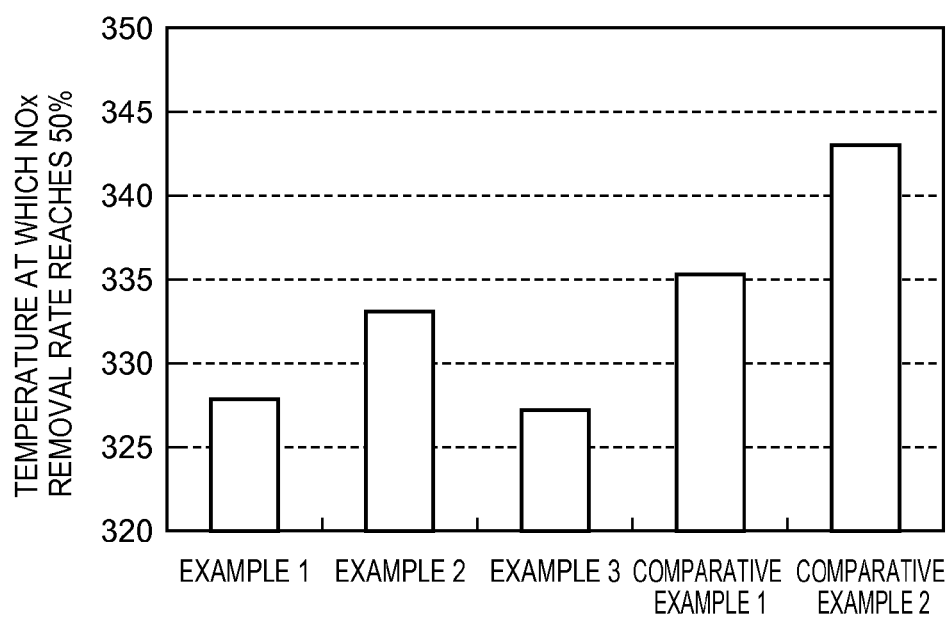
FIG. 4 is a graph illustrating experimental results regarding the temperature at which the NOx removal rate reaches 50% in examples and comparative examples.
Figure 5:
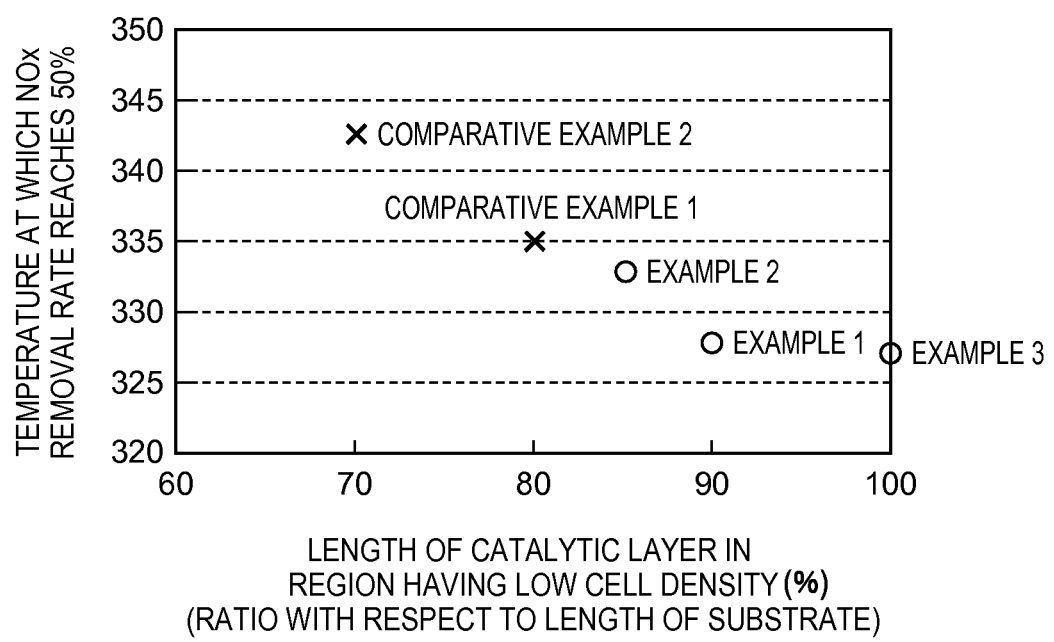
FIG. 5 is a graph obtained by converting the experimental results regarding the temperature at which the NOx removal rate reaches 50% in the examples and the comparative examples illustrated in FIG. 4, into experimental results regarding the length of a catalytic layer in a peripheral region (a ratio with respect to the length of a substrate) and the temperature at which the NOx removal rate reaches 50%.

The test results are illustrated in Table 1 indicated below and FIGS. 4 and 5. FIG. 4 is a graph illustrating experimental results regarding the temperature at which the NOx removal rate reaches 50% in the examples and the comparative examples. FIG. 5 is a graph obtained by converting the experimental results regarding the temperature at which the NOx removal rate reaches 50% in the examples and the comparative examples illustrated in FIG. 4, into experimental results regarding the length of the catalytic layer in the peripheral region (the ratio with respect to the length of the substrate) and the temperature at which the NOx removal rate reaches 50%.

TABLE 1

| Sample | Length of catalytic layer in region having high cell density (ratio (%) with respect to length of substrate) | Length of catalytic layer in region having low cell density (ratio (%) with respect to length of substrate) | Temperature at which NOx removal rate reaches 50% (° C.) |
| --- | --- | --- | --- |
| Example 1 | 80 | 90 | 327.7 |
| Example 2 | 80 | 85 | 332.9 |
| Example 3 | 80 | 100 | 327.1 |
| Comparative example 1 | 80 | 80 | 335.1 |

TABLE 1-continued

| Sample | Length of catalytic layer in region having high cell density (ratio (%) with respect to length of substrate) | Length of catalytic layer in region having low cell density (ratio (%) with respect to length of substrate) | Temperature at which NOx removal rate reaches 50% (° C.) |
|---|---|---|---|
| Comparative example 2 | 80 | 70 | 342.8 |

From Table 1 and FIGS. 4 and 5, it was confirmed that, in Examples 1 to 3, the temperature can be reduced by 2° C. to 8° C. as compared to Comparative example 1 and can be reduced by 10° C. to 16° C. as compared to Comparative example 2.

The embodiment of the present invention has been described above in detail with reference to the drawings. However, the specific configuration is not limited to the above-described embodiment. Design modifications within the scope of the present invention are included in the present invention.

REFERENCE SIGNS LIST

1/SUBSTRATE
1A/CENTRAL REGION
1Aa/CELL WALL SURFACE
1B/PERIPHERAL REGION
1Ba/CELL WALL SURFACE
2A/CATALYTIC LAYER (CATALYTIC LAYER IN CENTRAL REGION)
2Aa/LOWER LAYER
2Ab/UPPER LAYER
2B/CATALYTIC LAYER (CATALYTIC LAYER IN PERIPHERAL REGION)
2Ba/LOWER LAYER
2Bb/UPPER LAYER
10/CATALYTIC CONVERTER

The invention claimed is:

1. A catalytic converter comprising:
a substrate that has a cell structure and is configured to allow gas to flow through the substrate; and
a catalytic layer that is made of a noble metal catalyst and is formed on a cell wall surface of the substrate, the catalytic layer extending in a longitudinal direction of the substrate, wherein:
the substrate has a central region and a peripheral region, the central region having a cell density higher than a cell density of the peripheral region, wherein a length of the substrate in the central region is equal to a length of the substrate in the peripheral region;
the catalytic layer includes a first catalytic layer provided in the central region and a second catalytic layer provided in the peripheral region;
a length of the second catalytic layer in the longitudinal direction is larger than a length of the first catalytic layer in the longitudinal direction; and
the first catalytic layer and the second catalytic layer are each composed of two or more layers and having a same number of layers, and wherein, in the longitudinal direction, a layer of the two or more layers constituting the second catalytic layer is longer than a corresponding layer of the two or more layers constituting the first catalytic layer.

2. The catalytic converter according to claim 1, wherein a ratio of the length of the first catalytic layer in the longitudinal direction to a length of the substrate in the longitudinal direction is equal to or higher than 65%.

3. The catalytic converter according to claim 1, wherein:
a ratio of the length of the first catalytic layer in the longitudinal direction to a length of the substrate in the longitudinal direction is 80%; and
a ratio of the length of the second catalytic layer in the longitudinal direction to the length of the substrate in the longitudinal direction is 85% to 100%.

4. The catalytic converter according to claim 1, wherein the cell density of the central region is equal to or lower than two times the cell density of the peripheral region.

5. The catalytic converter according to claim 1, wherein each of the first catalytic layer and the second catalytic layer has an end that is positioned at a downstream end of the substrate along a direction in which the exhaust gas flows through the substrate.

* * * * *